(12) United States Patent
Lambert

(10) Patent No.: US 11,005,950 B1
(45) Date of Patent: May 11, 2021

(54) OPTIMIZED BLOOM FILTER

(71) Applicant: Marvell International Ltd., Hamilton (BM)

(72) Inventor: Paul A. Lambert, Mountain View, CA (US)

(73) Assignee: Marvell Asia Pte, Ltd., Singapore (SG)

( * ) Notice: Subject to any disclaimer, the term of this patent is extended or adjusted under 35 U.S.C. 154(b) by 268 days.

(21) Appl. No.: 15/040,764

(22) Filed: Feb. 10, 2016

Related U.S. Application Data

(60) Provisional application No. 62/114,241, filed on Feb. 10, 2015.

(51) Int. Cl.
| | |
|---|---|
| *H04L 29/08* | (2006.01) |
| *H04L 29/06* | (2006.01) |
| *G06F 16/22* | (2019.01) |
| *G06F 40/205* | (2020.01) |
| *H04W 4/029* | (2018.01) |
| *G06F 16/9535* | (2019.01) |
| *H04W 4/06* | (2009.01) |

(52) U.S. Cl.
CPC .......... *H04L 67/16* (2013.01); *G06F 16/2255* (2019.01); *G06F 40/205* (2020.01); *H04L 65/4076* (2013.01); *H04L 67/1065* (2013.01); *G06F 16/9535* (2019.01); *H04W 4/029* (2018.02); *H04W 4/06* (2013.01)

(58) Field of Classification Search
CPC ..... H04L 41/00; H04L 67/1065; H04L 67/16; H04W 48/08; H04W 12/0609; H04W 4/029; H04W 4/06; G06F 16/9535; G06F 16/2255

See application file for complete search history.

(56) References Cited

U.S. PATENT DOCUMENTS

| | | | | |
|---|---|---|---|---|
| 9,647,875 | B1 * | 5/2017 | Lambert | .................. H04L 41/12 |
| 2004/0103066 | A1 * | 5/2004 | Staddon | .................. H04L 9/083 |
| | | | | 705/80 |
| 2006/0019641 | A1 * | 1/2006 | Vayanos | ............. H04L 12/1895 |
| | | | | 455/414.1 |
| 2012/0158756 | A1 * | 6/2012 | Jimenez | .............. H04L 67/1065 |
| | | | | 707/754 |

(Continued)

OTHER PUBLICATIONS

IEEE Std 802.11™ 2012 (Revision of IEEE Std 802.11-2007) IEEE Standard for Information technology—Telecommunications and information exchange between systems—Local and metropolitan area networks—Specific requirements Part 11: Wireless LAN Medium Access Control (MAC) and Physical Layer (PHY) specifications, The Institute of Electrical and Electronics Engineers, Inc., pp. 1-2695 (Mar. 29, 2012).

(Continued)

*Primary Examiner* — Barbara B Anyan

(57) ABSTRACT

A method, implemented in a communication device, of indicating a service supported by the communication device. A hash value is generated, using a hash function, based on a service identifier associated with the service. Respective portions of the hash value are mapped to respective bit locations in a bit string that represents membership of the service in a set of services supported by the communication device. The bit string is generated at least by setting the bit locations in the bit string to values that indicate that the service is supported by the communication device.

14 Claims, 5 Drawing Sheets

(56) References Cited

U.S. PATENT DOCUMENTS

| | | | | |
|---|---|---|---|---|
| 2012/0311686 A1* | 12/2012 | Medina | ............ | H04W 12/0608 726/7 |
| 2013/0132408 A1* | 5/2013 | Little | ................. | G06F 16/2255 707/754 |
| 2013/0244614 A1* | 9/2013 | Santamaria | ....... | H04W 12/0609 455/411 |
| 2013/0339526 A1 | 12/2013 | Ruellan et al. | | |
| 2014/0188955 A1* | 7/2014 | Beck | ...................... | G06F 3/065 707/827 |
| 2014/0200032 A1* | 7/2014 | Edge, Jr. | ............... | H04W 4/029 455/456.3 |
| 2014/0222574 A1* | 8/2014 | Emigh | .................... | H04W 4/06 705/14.58 |
| 2015/0351018 A1* | 12/2015 | Kim | ...................... | H04W 76/14 370/338 |
| 2015/0379430 A1* | 12/2015 | Dirac | .................... | G06N 20/00 706/12 |
| 2016/0110391 A1* | 4/2016 | Korycki | ............. | G06F 16/2282 707/741 |
| 2016/0174134 A1* | 6/2016 | Srinivasa Gopalan | ...................... | H04W 48/14 370/254 |
| 2016/0253425 A1* | 9/2016 | Stoops | ................ | G06F 16/9535 707/754 |
| 2016/0337457 A1* | 11/2016 | Kim | ........................ | H04L 67/16 |

OTHER PUBLICATIONS

IEEE Std 802.11ac/D5.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-440 (Jan. 2013).

IEEE Std 802.11ac/D6.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-446 (Jul. 2013).

IEEE Std 802.11ac/D7.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-456 (Sep. 2013).

Lambert et al., "Service Identifiers and Bloom Filters," IEEE Draft, IEEE 802.11-14/1262 r03, 17 pages (May 13, 2015).

Lambert et al., "Service Identifiers and Bloom Filters," IEEE Draft, IEEE 802.11-14/1262 r02, 30 pages (Sep. 15, 2014).

"Wi-Fi Display Technical Specification Version 1.0.0", Wi-Fi Alliance® Technical Committee, Wi-Fi Display Technical Task Group, 149 pages (Aug. 24, 2012).

"Wi-Fi Peer-to-Peer (P2P) Technical Specification, Version 1.00", Wi-Fi Alliance, pp. 1-135, Dec. 1, 2009.

U.S. Appl. No. 14/215,141, filed Mar. 17, 2014.

\* cited by examiner

OPTIMIZED BLOOM FILTER

CROSS-REFERENCE TO RELATED APPLICATION

This claims the benefit of U.S. Provisional Patent Application No. 62/114,241, entitled "Optimized Bloom Filter" and filed on Feb. 10, 2015, the disclosure of which is hereby incorporated herein by reference.

FIELD OF THE DISCLOSURE

The present disclosure relates generally to communication networks and, more particularly, to discovery procedures within communication networks.

BACKGROUND

In some wireless communication networks, procedures are provided that allow a first device to discover other nearby devices that provide a service. For example, various service discovery protocols can be used by low-power devices configured to communicate with other devices in 802.11-based WiFi networks. In some such systems, a first device broadcasts a message indicating services supported by the first device so that other devices can discover the first device and/or determine which services are supported by the first device. Alternatively, a first device broadcasts a message indicating a service or a set of services requested by the first device, and other devices that support the requested service or services respond by transmitting a messages to the first device to indicate to the first device that the other devices supports the service or services requested by the first device.

SUMMARY

In an embodiment, a method, implemented in a communication device, of indicating a service supported by the communication device. The method comprises generating, based on a service identifier associated with the service, a hash value using a hash function. The method also comprises mapping respective portions of the hash value to respective bit locations in a bit string that represents membership of the service in a set of services supported by the communication device. The method additionally comprises generating the bit string, including setting the bit locations in the bit string to values that indicate that the service is supported by the communication device.

In another embodiment, a communication device comprises a network interface having one or more integrated circuits configured to generate, based on a service identifier associated with a service, a hash value using a hash function. The one or more integrated circuits are further configured to map respective portions of the hash value to respective bit locations in a bit string that represents membership of the service in a set of services supported by the communication device. The one or more integrated circuits are additionally configured to generate the bit string at least by setting the bit locations in the bit string to values that indicate that the service is supported by the communication device.

DETAILED DESCRIPTION

Figure 1:
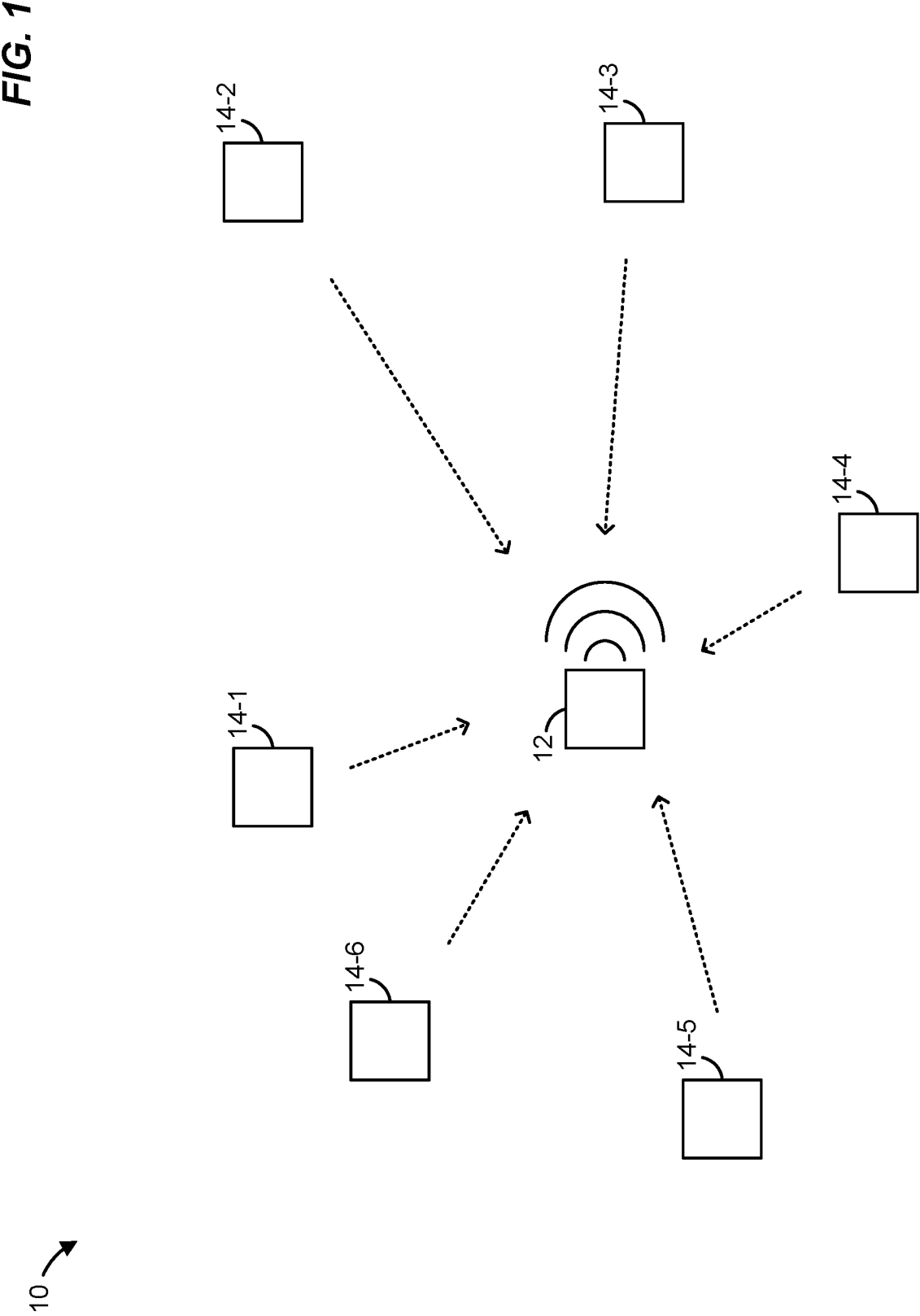
FIG. 1 is a block diagram of an example system in which discovery techniques described herein are implemented, according to one embodiment and scenario.

In embodiments described below, Bloom filters are used in the discovery process to indicate services supported by communication devices or services requested by communication devices. In some embodiments, for example, Bloom filters are used to compactly represent a set of one or more service supported by a communication device or a set of one or more services requested or desired by a communication device. A Bloom filter is a bit string that can be generated by determining multiple bit locations within the Bloom filter based on each of one or more inputs (e.g., service names, service identifiers, etc.), and setting the corresponding bits (e.g., to a logic "one") to indicate that the corresponding services are supported, or are requested, by the communication device. While Bloom filters do not provide false negatives, false positives (i.e., false indications that a particular input is indeed a group member) may result, with the probability of a false positive decreasing as the length of the Bloom filter increases.

The multiple bit locations for a particular hash service may be determined by applying multiple different hash functions to an input (e.g., a service name or a service identifier), and then mapping each resulting hash to a respective bit location in the bit string. However, applying multiple hash functions to each of one or more inputs may be computationally intensive, in at least some scenarios. Moreover, if the length of the bit string changes, for example with an increase or a decrease of the number of services represented by the Bloom filter and/or with a desired change of the probability of a false positive indication in the Bloom filter, the multiple hash functions may need to be re-applied to each of one or more inputs and the resulting hash values may need to be re-mapped to bit locations in the new longer or shorter Bloom filter.

In an embodiment, a single hash function is applied to each of one or more inputs (e.g., service names, service identifiers, etc.) to generate respective hash values for each of the one or more inputs, and multiple different portions of each of the respective hash values are mapped to multiple respective bit locations in the bit string. Thus, only a single hash function needs to applied to an input (e.g., a service name or a service identifier) in order to determine multiple locations in the bit string, in this embodiment. In some embodiments, the respective hash values that are determined for each of the one or more inputs are stored in a memory, and the multiple bit locations to represent a particular input are determined by retrieving multiple portions of the corresponding hash value from memory and mapping the retrieved multiple portions to respective bit locations in the bit string. Similarly, when a new bit string (e.g., a longer or a shorter bit string) is to be determined to represent a set of inputs that includes the particular input, the same multiple portions of the single hash value, or different multiple portions of the single hash value, are retrieved from the memory and are mapped to bit locations in the new bit string, in an embodiment. Accordingly, using respective single hash values to determine bit locations that represent each of the one or more inputs in the bit string eliminates the need to apply multiple hash functions to each of the one or more inputs, and to re-apply the multiple hash functions to the one or more inputs with a change in a length of the bit string, in various embodiments.

Although hashing techniques described herein are generally described as being used to generate bit strings that represent supported or requested services in a communication system, the same or similar techniques can be used in other contexts as well. In general, techniques the same as or similar to the techniques described herein can be used to generate any bit sting that represents membership of items in a set. As just an example, techniques the same as or similar to the techniques described herein are used to represent data stored in a database or a memory, such as a set of files or other data stored in a memory of a computing device.

FIG. 1 is a block diagram of an example communication system 10 in which discovery techniques described herein are implemented, according to one embodiment and scenario. FIG. 1 shows an embodiment and scenario in which the example communication system 10 includes a device 12, as well as six additional devices 14-1 through 14-6. In an embodiment, the device 12 is a device that is being discovered by the devices 14-1 through 14-6. In this embodiment, the device 12 transmits (e.g., broadcasts) a message, such as an announcement message (e.g., a beacon frame), that includes an indication of services supported by the device 12 such that devices 14-1 through 14-6 can determine whether desired services are supported by the device 12. In another embodiment or scenario, the device 12 transmits a service information response to a device 14 in response to receiving a service information request from the device 14. The service information response includes an indication of services supported by the device 12, in this embodiment and scenario. The device 14 determines, based on the service information response, whether one or more services desired by the device 14 are supported by the device 12, in an embodiment. In another embodiment, the device 12 is a discovering device. In this embodiment, the device 12 transmits (e.g., broadcasts) a message that includes an indication of services requested by the device 12 such that each of the devices 14 can determine whether the device 14 supports one or more of the services requested by the device 12. In an embodiment, if a device 14 determines that the devices 14 supports one or more of the services requested by the device 12, the device 14 transmits a response message to the device 12, wherein the response message includes an indication of the one or more services that are requested by the device 12 and are supported by the device 14.

While the embodiment and scenario of FIG. 1 shows six devices 14-1 through 14-6, other embodiments and/or scenarios include more or fewer devices 14. In the example embodiment of FIG. 1, the device 12, and each of the devices 14-1 through 14-6, is a WiFi-enabled device (e.g., is configured to operate according to the IEEE 802.11a standard, IEEE 802.11n standard, IEEE 802.11ac standard, IEEE 802.11ad standard, etc.). In an example embodiment, the device 12 is an access point (AP), and the devices 14 are client stations. In other embodiments the device 12, and each of the devices 14-1 through 14-6, is instead (or additionally) configured to operate according to a different wired communication protocol (e.g. an Ethernet protocol) and/or wireless communication protocol (e.g., a Bluetooth protocol).

For ease of explanation, the descriptions below will generally refer to an embodiment in which the devices 12 and 14-1 through 14-6 are WiFi-enabled devices.

Figure 2:
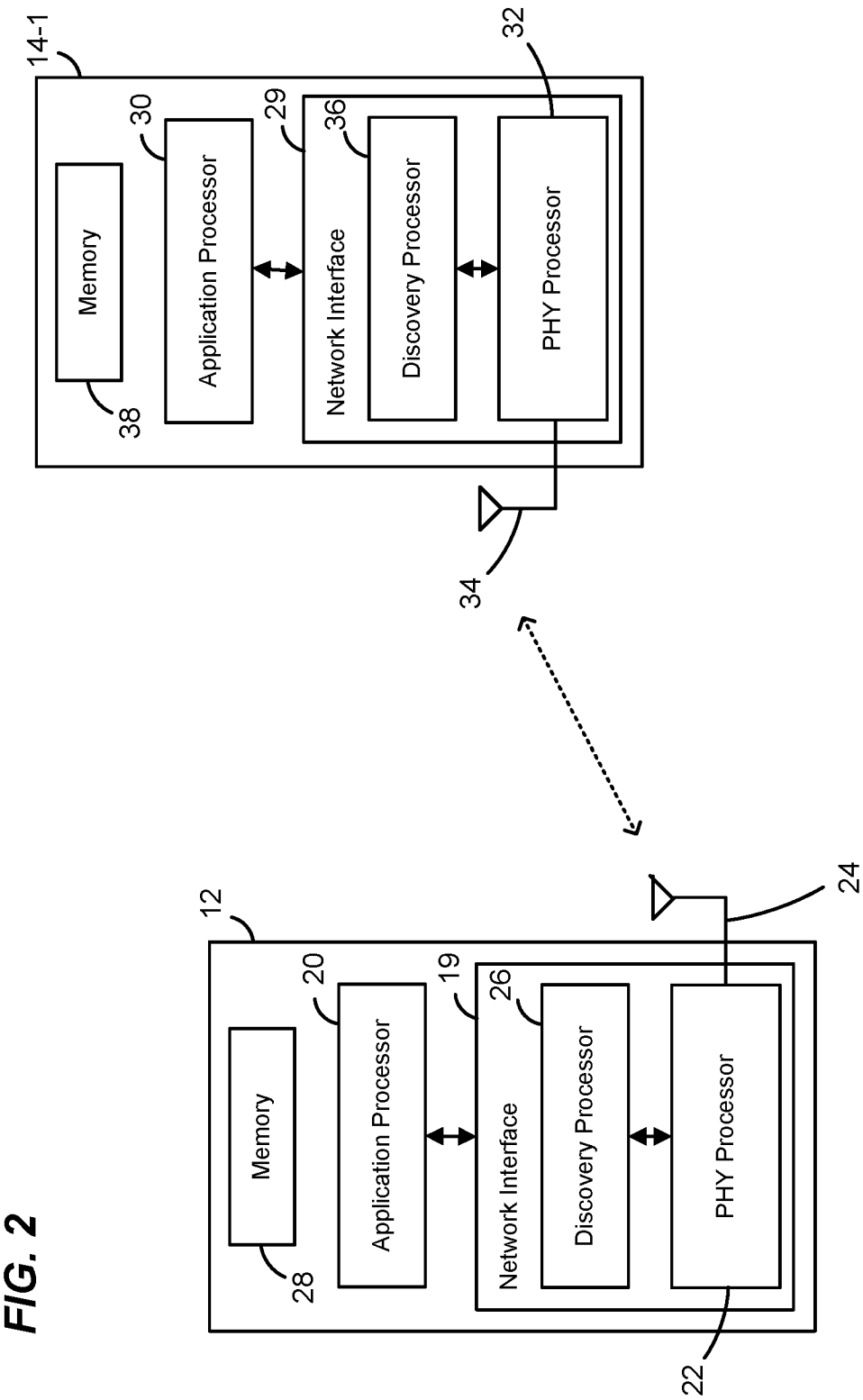
FIG. 2 is a block diagram providing additional detail of devices within the communication system of FIG. 1, according to an embodiment.

As seen in FIG. 2, device 12 includes a network interface 19 coupled to an application processor 20. In an embodiment, the network interface 19 includes one or more integrate circuits (ICs) configured to operate as discussed below. The network interface 19 includes a physical layer (PHY) processor 22 coupled to one or more antennas 24, and a discovery processor 26 coupled to the PHY processor 22. The device 12 also includes a memory 28. The PHY processor 22 is configured to perform at least Layer 1 WiFi operations for transmitting and receiving wireless signals via the antenna(s) 24, in an embodiment. In some embodiments, the PHY processor 22 is a physical/tangible processor, or a group of physical/tangible processors. In various different embodiments, for example, the PHY processor 22 includes one or more hardware processors, such as one or more processors on one or more integrated circuits (e.g., application-specific integrated circuits (ASICs), programmable logic devices, etc.), and/or includes one or more processors (e.g., a central processor (CPU) or a dedicated processor) that is/are configured to read and execute software or firmware instructions stored in memory 28 (or another memory not shown in FIG. 2).

In an embodiment, the discovery processor 26 is configured to perform at least Layer 2 and/or Layer 3 WiFi service discovery operations. These operations are discussed in more detail below, according to various embodiments. In an embodiment, the discovery processor 26 is also configured to perform other Layer 2 and/or Layer 3 WiFi operations, such as device discovery, connection and set-up. In some embodiments, the discovery processor 26 is configured to implement peer-to-peer (P2P) and/or tunneled direct link setup (TDLS) discovery functions.

The discovery processor 26 is a physical/tangible processor, or a group of physical/tangible processors, according to various embodiments. In various different embodiments, for example, the discovery processor 26 includes one or more hardware processors, such as one or more processors on one or more integrated circuits (e.g., ASICs, programmable logic devices, etc.), and/or includes one or more processors (e.g., a CPU or a dedicated processor) that is/are configured to read and execute software or firmware instructions stored in memory 28 (or another memory not shown in FIG. 2).

In an embodiment, the application processor 20 is configured to execute applications that can provide one or more services that may be utilized by other devices within communication system 10 (e.g., devices 14-1 through 14-6), such as an application that responds to requests to find/ identify friends, or applications that provide printing services, playing or displaying media, providing media content, gaming services, etc. In particular, in the scenario reflected in FIGS. 1 and 2, the application processor 20 of device 12 is configured to execute one or more applications providing services, with at least one of those services being a service that can be utilized by at least one application executed by application processor 20 of device 12. In some embodiments, the application processor 20 is also configured to execute one or more applications that can utilize services provided by other devices on network 10 (e.g., device 12 and/or any of devices 14-2 through 14-6). While FIG. 2 shows the application processor 20, the PHY processor 22, and the discovery processor 26 as separate processors, it is understood that, in some embodiments, a single physical/ tangible processor implements the functionality of the application processor 20, the PHY processor 22, and/or the discovery processor 26, or that the functionality of the application processor 20, the PHY processor 22, and/or the discovery processor 26 is distributed across the same group of physical/tangible processors.

In an embodiment, the memory 28 is a non-transitory, tangible, computer-readable memory that includes one or more volatile and/or nonvolatile memories, such as a random access memory (RAM) and/or a read-only memory (ROM), for example. As noted above, the memory 28 in some embodiments stores instructions that are executed by the application processor 20, the discovery processor 26, and/or the PHY processor 22. Additionally (or alternatively), in some embodiments, the memory 28 stores other information, such as Bloom filters, pre-computed hash values, and/or device identifiers, as is discussed in further detail below.

The device 14-1 includes a network interface 29 coupled to an application processor 30. In an embodiment, the network interface 29 includes one or more integrate circuits (ICs) configured to operate as discussed below. The network interface 29 includes a physical layer (PHY) processor 32 coupled to one or more antennas 34, and a discovery processor 36 coupled to the PHY processor 32. The device 14-1 also includes a memory 38. The PHY processor 32 is configured to perform at least Layer 1 WiFi operations for transmitting and receiving wireless signals via the antenna(s) 32, in an embodiment. In an embodiment, the PHY processor 32 is the same as or similar to the PHY processor 22 of the device 12.

In an embodiment, the discovery processor 36 is configured to perform at least Layer 2 and/or Layer 3 WiFi service discovery operations. These operations are discussed in more detail below, according to various embodiments. In an embodiment, the discovery processor 36 is also configured to perform other Layer 2 and/or Layer 3 WiFi operations, such as device discovery, connection and set-up. In some embodiments, the discovery processor 34 is configured to implement P2P and/or TDLS discovery functions. In an embodiment, the discovery processor 36 is the same as or similar to the discovery processor 26 of the device 12.

In an embodiment, the application processor 30 is configured to execute applications that utilize one or more services provided by other devices within communication system 10 (e.g., device 12 or any one or more of devices 14-2 through 14-6). In various embodiments, for example, the application processor 30 executes an application that finds/identifies "friends" who are nearby (e.g., where other nearby devices that execute the same application provide a service by responding to scans/queries for friends), an application that generates content (e.g., a word processing application) that can be printed by another device within communication system 10, an application that provides content (e.g., music, photographs, video, etc.) that can be played or displayed by another device within communication system 10, an application that determines or displays location information based on location data provided by other devices within communication system 10, a gaming application that can accept inputs from (and/or provide outputs to) gaming services/applications of other devices within communication system 10, etc. In some embodiments, the application processor 30 is also configured to execute applications that provide one or more services that may be utilized by other devices within communication system 10 (e.g., device 12 or any one or more of devices 14-2 through 14-6), such as printing services, media display services, gaming services, etc. The application processor 30 is the same as or similar to the application processor 20 of the device 12. The application processor 30 is a physical/tangible processor, or a group of physical/tangible processors, according to various embodiments. In one embodiment, for example, the application processor 30 includes one or more processors (e.g., a CPU or a dedicated processor) that is/are configured to read and execute software or firmware instructions stored in memory 38 (or another memory not shown in FIG. 2).

In an embodiment, the memory 38 is a non-transitory, tangible, computer-readable memory that includes one or more volatile and/or nonvolatile memories, such as RAM and/or ROM, for example. The memory 38 in some embodiments stores instructions that are executed by the application processor 30, the discovery processor 36, and/or the PHY processor 32. Additionally (or alternatively), in some embodiments, the memory 38 stores other information, such as Bloom filters and/or device identifiers, as is discussed in further detail below.

In some embodiments, devices 14-2 through 14-6 of FIG. 1 are the same as or similar to the device 14-1 as shown in FIG. 2.

Figure 3:
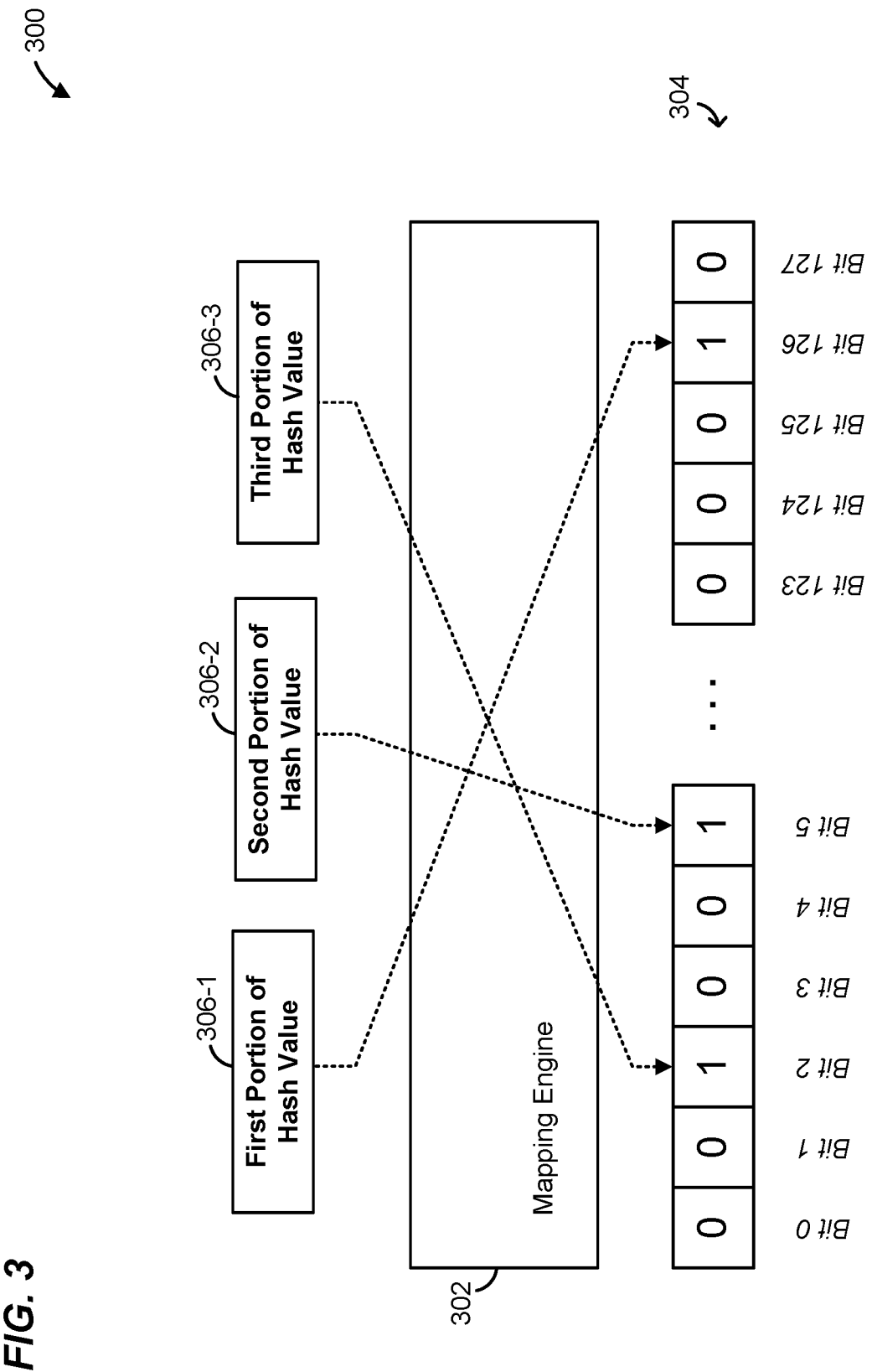
FIG. 3 is a diagram of an example process for using a hash value to determine bit locations in a Bloom filter, according to an embodiment.

FIG. 3 is a diagram of an example process 300 for using a generated hash value to determine bit locations in a Bloom filter 302, according to an embodiment. The example process 300 is generally described with reference to embodiments in which a communication device (e.g., device 12) generates a Bloom filter to indicate membership of one or more services supported by the communication device. It is noted, however, that the same or similar process is performed by a communication device (e.g., the device 12 or one or the device 14-1 through 14-6) to indicate a set of one or more services requested by the communication device, in some embodiments.

In the process 300, a mapping engine 302 operates on portions of hash values corresponding to a set of one or more services supported by, or being requested by, a communication device to determine bit locations in a Bloom filter that represents the set of services, in an embodiment. In an embodiment, the respective hash values are generated, or pre-computed, by applying a hash function to respective identifiers of the services (e.g., string identifiers such as Bonjour or UPnP string identifier or service names, service IDs, etc.) prior to execution of the process 300 and are stored in a memory (e.g., the memory 28 or another suitable memory) of the communication device. The process 300 then retrieves portions, or fields, of the stored hash values from the memory, and the mapping engine 302 maps portions retrieved from the memory to respective bit locations in the Bloom filter 304. In another embodiment, the respective hash values are generated as part of the process 300, and portions of a particular hash value are selected from the output of the hash function. The mapping engine 302 maps the hash value portions, selected from the output of the hash function, to respective bit locations in the Bloom filter 304, in this embodiment.

Figure 4:
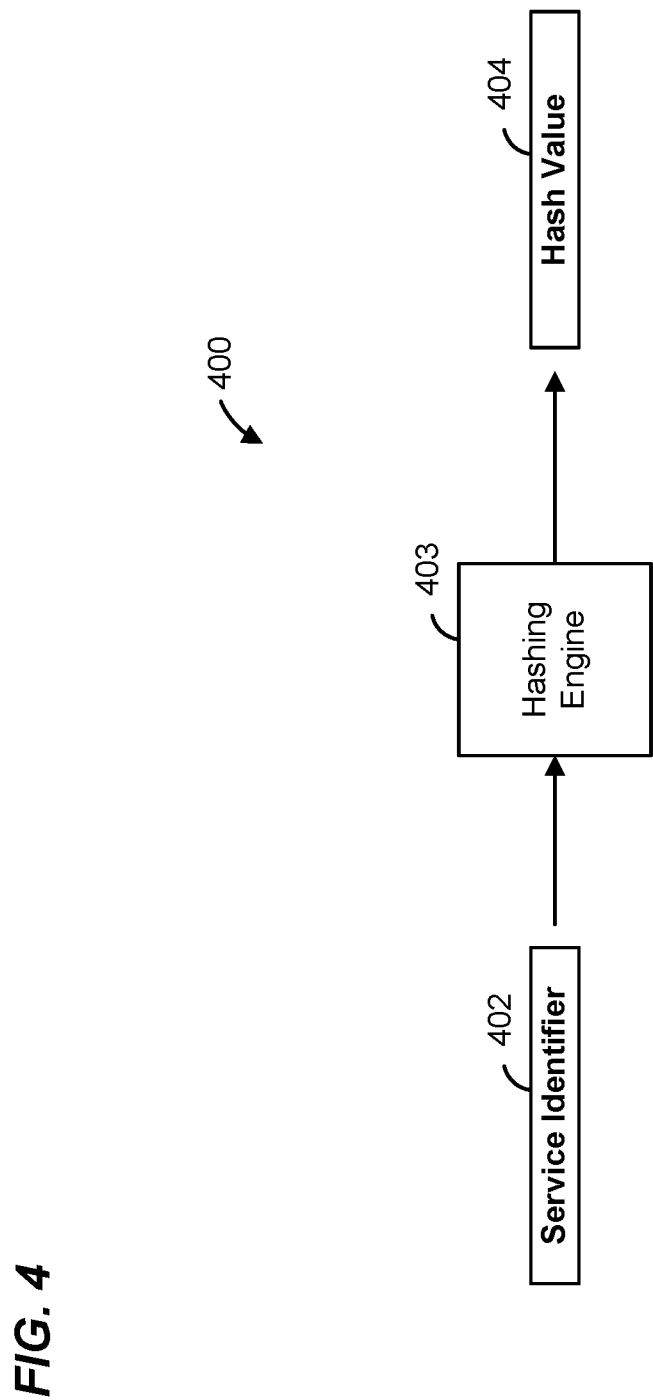
FIG. 4 is a block diagram of an example hash value generator within a device of FIG. 2, according to an embodiment.

Referring briefly to FIG. 4, a hashing engine 403 operates on a service identifier 402 associated with a service, such as a gaming application or a printing service, for example, to generate a hash value 404 for the service. In an embodiment, the service identifier 402 is a string identifier a string identifier (e.g., a Bonjour or UPnP string identifier) or a service ID associated with the service, for example. In another embodiment, other suitable service identifiers are used. In an embodiment, the hashing engine 403 applies a suitable hash function, such as a cryptographically strong hash function that implements a "secure hash algorithm" (e.g., SHA-1 or SHA-256), to the service identifier 402 to generate the hash value 404. In an embodiment, the hashing engine 403 causes the hash value 404 to be stored in a memory, such as the memory 28 of the device 12 or another suitable memory of the device 12. In some embodiments, only a portion of the hash value 404 is stored in the memory. For example, a unique service identifier (USID) that contains only a portion of the hash value 404, rather than the entire hash value 404, is stored in the memory. As just an example, in an embodiment in which the hashing engine applies the SHA-256 algorithm to the service identifier 402 to generate a 256 bit hash value 404, a USID that contains only first 128 bits of the hash value 404 is stored in the memory. In some embodiments, the hashing engine 403 generates the hash value 404 for a purpose other than device discovery. For example, the hashing engine 403 generates the hash value 404 as part of an application authentication procedure, in an embodiment. The process 300 for generating a Bloom filter to be used in device discovery reuses the hash value 404 generated for a purpose other than device discovery, or a portion of the hash value 404 generated for a purpose other than device discovery, without generating a hash value specifically for device discovery, in such embodiments.

Referring back to FIG. 3, the process 300 utilizes respective multiple portions 306 of a hash value, such as the hash value 404 or a portion thereof, stored in a memory, to generate the Bloom filter 304. In the example embodiment of FIG. 3, the Bloom filter 304 comprises 128 bits, and the mapping engine 302 maps three respective portions of a hash value, such as the has value 402 or a portion thereof, to respective ones of the 128 bits. In other embodiments, the Bloom filter 304 comprises suitable numbers of bits less than 128 bits or more than 128 bits. Similarly, suitable numbers of hash portions less than three portions or more than three portions of a hash value are mapped to corresponding numbers of bit locations in the Bloom filter 304, in some embodiments.

In an embodiment, the portions 306 are any suitable non-overlapping portions of the hash value 404. For example, in some embodiments, the portions 306 correspond to respective two-byte portions of the hash value 404. As just an example, in some embodiments, the portions 306 correspond to respective consecutive two-byte portions of the hash value 404. For example, the first portion 306-1 corresponds to the first two bytes (e.g., byte 0 and byte 1) of the hash value 404, the second portion 306-2 corresponds to the next two bytes (e.g., byte 2 and byte 3) and the third portion 306-3 corresponds to the following two bytes (e.g., byte 4 and byte 5) of the hash value 404, in one such embodiment. In other embodiments, other suitable portions of the hash value 404. In some embodiments, at least some of the portions 306 overlap each other.

The mapping engine 302 implements any suitable mapping scheme to map the portions 306 to bit locations in the Bloom filter 304. For example, in an embodiment, each portion 306 maps directly to a bit location in the Bloom filter 304. In some embodiments, however, range of possible values of a portion 306 is greater than the number of bit locations in the Bloom filter 304. In such embodiments, the mapping engine 302 implements a mapping scheme that maps the greater range of values of a portion 306 to the range covered by the Bloom filter 304. For example, the mapping engine 302 performs modulo (mod) operation on the value (e.g., integer value, binary value, etc.) I of a portion 306 such that the value I maps to a bit location l determined by l=I mod m, where m is the length of the Bloom filter 304 and I mod m is the remainder of division of I by m. As a more specific example, in an embodiment in which the Bloom filter 304 comprises 128 bits and, accordingly, 128 bit locations, and each portion 306 comprises two bytes, then the possible integer values of the two bytes (i.e., $2^{16}$=65, 536) exceeds the range covered by the 128 bits of the Bloom filter 304. Continuing with this embodiment, the mapping engine 302 maps each portion 306 to a bit location l in the Bloom filter 304 according to l=I mod 128. Thus, for example, if the integer value of the portion 306-1 is 43,518, then the portion 306-1 maps to bit location l26 in the filter 304, as illustrated in FIG. 3, in an example embodiment.

In an embodiment, bit locations to which portions 306 are mapped by the mapping engine 302 are set to "one" instead of a default "zero" to indicate membership of the corresponding service in a set of services represented by the Bloom filter 304. In an alternative embodiment, the Bloom filter 304 instead sets all bits to "one" as the default (empty) state, and each of the portions 306 is then mapped to a "zero" at the respective bit location.

In an embodiment, to generate the Bloom filter 304, the mapping engine 302 operates on portions 306 of each of multiple hash values corresponding to respective multiple services to be represented by the Bloom filter 304. Each of the bit location determined for each portion 306 of each of the multiple hash value is set (e.g., to a logic "one") to indicate membership of the corresponding services in the set of services represented by the Bloom filter 304. In an embodiment, separate bit strings corresponding to the Bloom filter 304 are generated for each hash value 404 corresponding to each service to be represented by the Bloom filter 304, and the separate bit strings are combined using an XOR operation to generate the final Bloom filter 304. In other embodiments, the Bloom filter 304 having logic "ones" (or alternatively logic "zeros" if the default or empty state of the Bloom filter 304 is all "ones") at bit locations determined based on multiple portions 306 of each of multiple hash values is generated in other suitable manners.

In an embodiment, subsequent to generating the Bloom filter 304, the device 12 generates a new Bloom filter of a length different than the Bloom filter 304. For example, the length of the Bloom filter is increased because the device 12 wishes to indicate membership of one or more additional services in the set of services supported by the device 12 and/or wishes to decreases probability of a false positive indication by the Bloom filter 304, in some embodiments. Alternatively, the length of the Bloom filter is decreased because the device 12 wishes to indicate a reduced set of services supported by the device 12. In an embodiment, the device 12 generates the new Bloom filter by remapping the portions 306 of the hash value 404 to bit locations in the new Bloom filter. For example, the device 12 remaps the portions 306 of the hash value 404 by performing modulo operation of the values of the portions 306 modulo new Bloom filter length, in an embodiment.

A receiving device, such as a communication device 14, that receives the Bloom filter 304, e.g. as part of a beacon message broadcast by the communication device 12 or as part of a service information response received from the communication device 12, determines, based on the Bloom filter 304, whether one or more services desired by the device 14 are supported by the device 12, in an embodiment. For example, the device 14 generates a local Bloom filter that represents services of interest to the communication device 14 and compares the locally generated Bloom filter to the received Bloom filter 304, in an embodiment. To generate a local Bloom filter, the communication device 14 utilizes a process generally the same as the process 300 described with respect to FIGS. 3 and 4. For example, for a particular service of interest to the communication device 14, the device 14 maps respective portions of a hash value generated, or pre-computed, using the same identifier of the service (e.g., string identifier, service name, service ID, etc.) as were used (e.g., if the service is indeed supported by the device 12) for the service to generate the Bloom filter 304 at the communication device 12. In an embodiment, the communication device 14 checks whether the bit locations determined using the portions of the hash value all have the value (e.g., logic "one") that indicates membership of the service in the set of service represented by the Bloom filter 304. If the bit location determined using the portions of the hash value of the service at device 14 all have the value (e.g., logic "one") that indicates membership of the service in the set of service represented by the Bloom filter 304, then the device 14 determines that the service is supported by the device 12, in an embodiment. On the other hand, if at least one of the bit locations determined using the portions of the hash value of the service at device 14 has a value of "zero," then the device 14 determines that the service is not supported by the device 12, in this embodiment.

Figure 5:
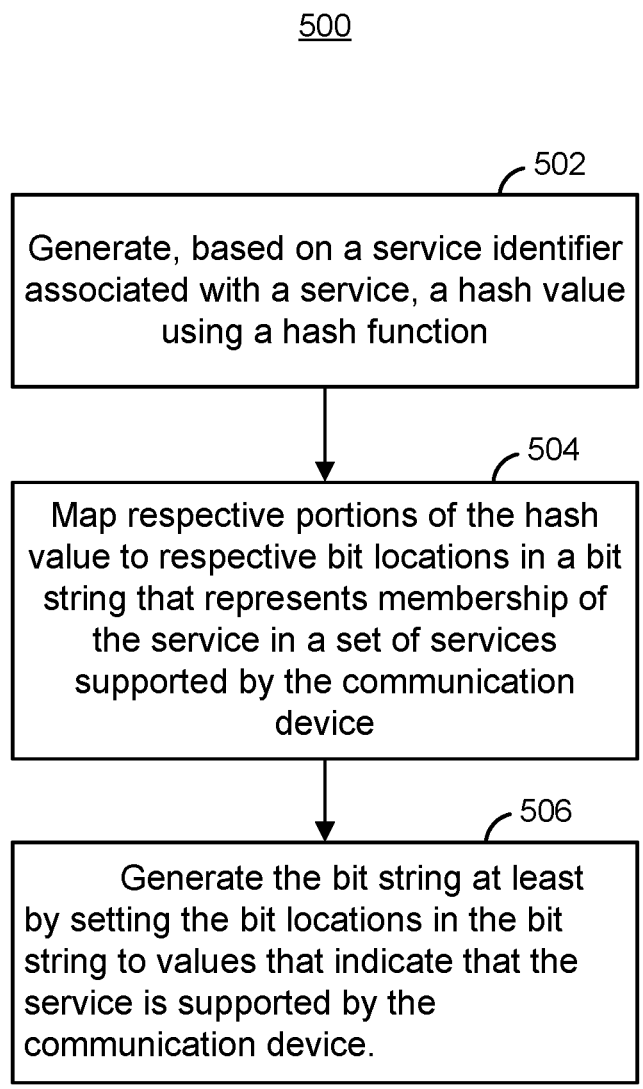
FIG. 5 is a flow diagram of an example method of indicating a service supported by a communication device, according to an embodiment.

FIG. 5 is a flow diagram of an example method 500 of indicating a service supported by a communication device, according to an embodiment. The method 500 is implemented in a first communication device. In one embodiment, for example, the method 500 is implemented in device 12 of FIGS. 1 and 2. More specifically, in one embodiment, the method 500 is implemented by the discovery processor 26 of the device 12. In other embodiments, the method 500 is implemented in part by the discovery processor 26, and in part by one or more other processors of the device 12 (e.g., PHY processor 22, application processor 20, and/or one or more other processors not shown in FIG. 2).

At block 502, a hash function is used to generate a hash value based on a service identifier associated with a service. In an embodiment, the service identifier is a service name or a service ID generated based on the service name. In an embodiment, the hash function is a cryptographically strong hash function, such as a hash function that implements an SHA algorithm. In other embodiments, other suitable service identifiers and/or other suitable hash functions are used at block 502.

At block 504, respective portions of the hash value generated at block 502 are mapped to respective bit locations in a bit string that represents membership of the service in a set of services supported by the communication device. In an embodiment, two or more consecutive two-byte portions of the hash value generated at block 502 are mapped to respective bit locations in the bit string at block 504. In another embodiment, other suitable portions of the hash value generated at block 502 are mapped to respective bit locations in the bit string at block 504. In an embodiment, the portions of the hash value generated at block 502 that are mapped to respective bit locations in the bit string at block 504 are non-overlapping portions of the hash value generated at block 502. In another embodiment, at least some of the portions of the hash value generated at block 502 that are mapped to respective bit locations in the bit string at block 504 overlap each other. In an embodiment, mapping portions of the hash value generated at block 502 includes performing an operation to obtain a value of a portion of the hash value modulo a length of the bit string to ensure that result maps within the range of the bit string even if the range of possible values of the portion being mapped exceeds the range of the bit string.

At block 506, the bit string is generated. Generating the bit string includes setting the bits at bit locations determined at block 504 to values that indicate membership of the service in the set of services supported by the communication device. For example, in an embodiment, if bits corresponding to the bit locations to which the respective portions of the hash value corresponding to a service map in the bit string are set to a logic "one," this indicates that the service is supported by the communication device, or at least is very likely supported by the communication device, in an embodiment. On the other hand, if at least one of the bits corresponding to the bit locations to which the respective portions of the hash value corresponding to the service map in the bit string is set to a logic "zero," this indicates that the service is definitely not supported by the communication device, in an embodiment. Accordingly, to indicate that the service is supported by the communication device, generating the bit string at block 506 includes setting the bit locations determined at block 504 to logic "ones," in this embodiment.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any computer readable memory such as on a magnetic disk, an optical disk, or other storage medium, in a RAM or ROM or flash memory, processor, hard disk drive, optical disk drive, tape drive, etc. The software or firmware instructions may include machine readable instructions that, when executed by one or more processors, cause the one or more processors to perform various acts.

When implemented in hardware, the hardware may comprise one or more of discrete components, an integrated circuit, an application-specific integrated circuit (ASIC), a programmable logic device (PLD), etc.

While the present invention has been described with reference to specific examples, which are intended to be illustrative only and not to be limiting of the invention, changes, additions and/or deletions may be made to the disclosed embodiments without departing from the scope of the claims.

What is claimed is:

1. A method, implemented in a communication device, of indicating a service supported by the communication device, the method comprising:
   generating, by the communication device, a single hash value by applying a single hash function to a service identifier associated with the service;
   determining, by the communication device based on the single hash value, multiple bit locations in a first Bloom filter for advertising services supported by the communication device, including:
   selecting separate respective portions of the single hash value that was generated by applying the single hash function to the service identifier, and
   mapping each selected portion of the single hash value to a respective one of the multiple bit locations in the first Bloom filter, including performing a modulo (mod) operation to compute i) a value of a selected portion of the single hash value mod ii) a length of the first Bloom filter to determine a corresponding bit location in the first Bloom filter, so that the multiple bit locations are determined without generating multiple hash values by applying multiple hash functions to the service identifier;

generating, by the communication device, the first Bloom filter, including setting the determined multiple bit locations in the first Bloom filter to values that indicate that the service is supported by the communication device, wherein the first Bloom filter is different from the single hash value;

transmitting the first Bloom filter from the communication device to one or more other communication devices to indicate to the one or more other communication devices that the service is supported by the communication device and subsequently to generating the first Bloom filter, generating a second Bloom for advertising services supported by the communication device, the second Bloom filter being of a different length from the first Bloom filter, wherein generating the second Bloom filter includes remapping the respective portions of the single hash value, that was generated by applying the single hash function to the service identifier, to respective bit locations in the second Bloom filter.

2. The method of claim 1, further comprising generating, by the communication device, the first Bloom filter based on one or more bit strings that indicate membership of one or more other services supported by the communication device.

3. The method of claim 1, wherein the service identifier is one of (i) a service name associated with the service or (ii) a service identifier (ID) associated with the service.

4. The method of claim 1, wherein generating the single hash value comprises generating the single hash value by applying a secure hash algorithm (SHA) hash function to the service identifier associated with the service.

5. The method of claim 4, wherein the SHA hash function is SHT-256 hash function, and wherein the single hash value comprises 256 bits.

6. The method of claim 1, further comprising:
storing, by the communication device, the generated single hash value in a memory; and
retrieving, by the communication device, the respective portions from the memory.

7. The method of claim 1, wherein generating the second Bloom filter further includes
setting the respective bit locations in the second Bloom filter to values that indicate that the service is supported by the communication device.

8. A communication device, comprising
a network interface having one or more integrated circuits configured to:
generate a single hash value by applying a single hash function to a service identifier associated with the service,
determine, based on the single hash value, multiple bit locations in a first Bloom filter for advertising services supported by the communication device, wherein the one or more integrated circuits are configured to map, to respective ones of the multiple bit locations in the first Bloom filter, respective portions of the single hash value generated by applying the single hash function to the service identifier, the mapping including performing a modulo (mod) operation to compute i) a value of a respective portion of the single hash value mod ii) a length of the first Bloom filter to determine a corresponding bit location in the first Bloom filter, so that the multiple bit locations are determined without generating multiple hash values by applying multiple hash functions to the service identifier so that the multiple bit locations are determined without generating multiple hash values by applying multiple hash functions to the service identifier, generate the first Bloom filter at least by setting the multiple bit locations in the Bloom filter to values that indicate that the service is supported by the communication device, wherein the first Bloom filter is different from the single hash value, transmit the first Bloom filter to one or more other communication devices to indicate to the one or more other communication devices that the service is supported by the communication device, and subsequently to generating the first Bloom filter, generate a second Bloom for advertising services supported by the communication device, the second Bloom filter being of a different length from the first Bloom filter, wherein generating the second Bloom filter includes remapping the respective portions of the single hash value, that was generated by applying the single hash function to the service identifier, to respective bit locations in the second Bloom filter.

9. The communication device of claim 8, wherein the one or more integrated circuits are further configured to generate the first Bloom filter based on one or more bit strings that indicate membership of one or more other services supported by the communication device.

10. The communication device of claim 8, wherein the service identifier is one of (i) a service name associated with the service or (ii) a service identifier (ID) associated with the service.

11. The communication device of claim 8, wherein the one or more integrated circuits are configured to generate the single hash value by applying a secure hash algorithm (SHA) hash function to the service identifier associated with the service.

12. The communication device of claim 11, wherein the SHA hash function is SHA-256 hash function, and wherein the single hash value comprises 256 bits.

13. The communication device of claim 8, wherein the one or more integrated circuits are further configured to store the single hash value in a memory, and map respective portions of the single hash value to respective bit locations in the Bloom filter at least by mapping the respective portions retrieved from the memory.

14. The communication device of claim 8, wherein generating the second Bloom filter further includes
setting the respective bit locations in the second Bloom filter to values that indicate that the service is supported by the communication device.

* * * * *